US010768303B2

(12) United States Patent
Xiong et al.

(10) Patent No.: US 10,768,303 B2
(45) Date of Patent: Sep. 8, 2020

(54) METHOD FOR IDENTIFYING INDIVIDUAL TREES IN AIRBORNE LIDAR DATA AND CORRESPONDING COMPUTER PROGRAM PRODUCT

(71) Applicants: YaDo Holding B.V., Eindhoven (NL); Biao Xiong, Enschede (NL)

(72) Inventors: Biao Xiong, Enschede (NL); Dong Yang, Haarle (NL)

(73) Assignees: YaDo Holding B.V., Eindhoven (NL); Biao Xiong, Eindhoven (NL)

( * ) Notice: Subject to any disclaimer, the term of this patent is extended or adjusted under 35 U.S.C. 154(b) by 376 days.

(21) Appl. No.: 15/755,100

(22) PCT Filed: Aug. 24, 2016

(86) PCT No.: PCT/NL2016/050590
§ 371 (c)(1),
(2) Date: Jun. 7, 2018

(87) PCT Pub. No.: WO2017/034405
PCT Pub. Date: Mar. 2, 2017

(65) Prior Publication Data
US 2020/0124731 A1   Apr. 23, 2020

(30) Foreign Application Priority Data
Aug. 24, 2015  (NL) ..................... 2015333

(51) Int. Cl.
*G06K 9/00*          (2006.01)
*G01S 17/89*         (2020.01)
(Continued)

(52) U.S. Cl.
CPC ............ *G01S 17/89* (2013.01); *G06T 3/0037* (2013.01); *G06T 7/11* (2017.01);
(Continued)

(58) Field of Classification Search
CPC . G06T 2207/30188; G06T 2207/20152; G06T 2207/10032; G06T 3/0037;
(Continued)

(56) References Cited
U.S. PATENT DOCUMENTS
2009/0310867 A1* 12/2009 Matei ....................... G06T 7/11
                                                             382/195

OTHER PUBLICATIONS
Wang et al, ("Lidar point cloud based fully automatic 3D single tree modelling in Forest and evaluations of the procedure", Congress youth forum, Jul. 11, 2008, pp. 45-52 (Year: 2008).*
(Continued)

*Primary Examiner* — Amara Abdi
(74) *Attorney, Agent, or Firm* — N. V. Nederlandsch Octrooibureau; Catherine A. Schultz; Katelyn J. Bernier

(57) ABSTRACT

The invention relates to a method for identifying individual trees in airborne lidar data and a corresponding computer program product. The method comprises:
a. obtaining lidar data points of a group of one or more trees;
b. define voxels in a regular 3D grid on the basis of the data points;
c. applying an image segmentation algorithm to obtain at least one segment;
and, if at least two segments are obtained:
d. find the root voxel and branch voxels of a first segment and a second neighbouring segment; and
e. merging the first and second segment if the distance between the first and second root voxel is less than a first threshold, the distance between the first root voxel and the closest second branch voxel is less than a second threshold; and the distance between the first branch voxels and the second branch voxels is less than a third threshold.

10 Claims, 5 Drawing Sheets

(51) Int. Cl.
*G06T 7/11* (2017.01)
*G06T 3/00* (2006.01)

(52) U.S. Cl.
CPC ............... *G06T 2207/10032* (2013.01); *G06T 2207/20152* (2013.01); *G06T 2207/30188* (2013.01)

(58) Field of Classification Search
CPC ..... G06T 7/11; G06K 9/00657; G01S 7/4802; G01S 17/89
See application file for complete search history.

(56) References Cited

OTHER PUBLICATIONS

Wang et al ("A Lidar Point Cloud based Procedure for Vertical Canopy Structure analysis and 3D single Tree Modelling in Forest", Sensors 2008, 8, 3938-3951; DOI: 10.3390/s8063938 (Year: 2008).*

Yuchu et al, ("Individual Tree segmentation over large areas using airborne Lidar point cloud and very high resolution optical imagery", IEEE 2014, pp. 800-803 (Year: 2014).*

Reitberger et al, '3D segmentation of single trees exploiting full waveform LIDAR data', ISPRS Journal of Photograitunetiy and Remote Sensing 64 (2009) 561-574.

Plaza et al., '3D Segmentation Method for Natural Environments based on a Geometric-Featured Voxel Map', p. 1602-1607, 2015.

Wu et al., 'A Voxel-Based Method for Automated Identification and Morphological Parameters Estimation of Individual Street Trees from Mobile Laser Scanning Data', Remote Sens. 2013,5, 584-611; doi:10.3390/rs5020584, Remote Sensing, ISSN 2072-4292, www.mdpi.com/journal/remotesensing.

Wang et al., 'Lidar Point Cloud Based Fully Automatic 3D Singl Tree Modelling in Forest and Evaluations of the Procedure', The International Archives of the Photogrammetry, Remote Sensing and Spatial Information Sciences. vol. XXXVII. Part B6b. Beijing 2008, p. 45-52.

* cited by examiner

METHOD FOR IDENTIFYING INDIVIDUAL TREES IN AIRBORNE LIDAR DATA AND CORRESPONDING COMPUTER PROGRAM PRODUCT

The invention relates to a method for identifying individual trees in airborne lidar data. It is known in the art to use airborne lidar data to generate 3D models of cities and landscapes. However, current methods of reconstruction 3D models on the basis of the lidar data often require extensive manual work. Moreover, if computerised methods are available, often the generated models suffer from errors which need to be corrected manually.

A particular difficult problem in processing lidar data is to accurately identify individual trees in lidar data, to be able to model individual trees. Accurately modelling trees is not only relevant for an accurate representation of a city or landscape, but has a multitude of applications in forestry and agriculture. For example, if individual trees can be accurately identified and modelled, the total number of trees may be obtained, the type of each tree may be determined and/or the volume of each tree may be determined.

Unfortunately, conventional methods are not able to accurately identify individual trees in lidar data. Although methods are available that can correctly distinguish between trees and other object, e.g. buildings, the conventional methods are not able to separate the data corresponding to trees into individual trees. In particular, overlapping tree canopies result in multiple trees being identified as a single tree by conventional methods.

A goal of the invention is to solve the above problems and to provide a method for accurately identifying individual trees in airborne lidar data.

This goal is achieved with the method according to the invention, the method comprising the steps of:
a. obtaining lidar data of a group of one or more trees to be separated into individual trees, the lidar data comprising a plurality of lidar data points;
b. define voxels in a regular 3D grid on the basis of the lidar data points;
c. applying an image segmentation algorithm to obtain at least one segment comprising a subset of the 3D voxels;

wherein the following steps are performed if at least two segments are obtained in step c.:
d. for each of a first segment and a second neighbouring segment of said at least two segments:
  I. find the root voxel of said segment, the root voxel being a voxel having the lowest height of the voxels of said segment;
  II. find the branch voxels of said segment, wherein a branch voxel is a voxel connected directly or indirectly to the root voxel;
e. merging the first segment and the neighbouring second segment if:
  I. the distance between the root voxel of the first segment and the root voxel of the second segment is less than a first threshold; and
  II. the distance between the root voxel of the first segment and the closest branch voxel of the second segment is less than a second threshold; and
  III. the distance between each of the branch voxels of the first segment and the corresponding closest branch voxels of the second segment is less than a third threshold.

In step a), airborne lidar data is obtained from a group of one or more trees. As discussed above, said data may be separated into tree data and non-tree data using conventional algorithms. The tree data comprises lidar data of a group of one or more trees to be separated into individual trees.

Lidar data comprises a number of lidar data points. Each data point comprises a 3D coordinate. Nowadays, lidar systems are capable of providing a high density point cloud of 5 cm precision in the vertical direction, and 10 cm precision in the horizontal plane. Preferably, lidar data having a point density of 5-20 points/$m^2$ is used. However, the invention is not limited to the aforementioned point densities.

In step b) of the method, the lidar data points are arranged into a regular 3D grid to obtain 3D voxels. For example, 3D voxels are defined having a predetermined width, length and height respectively, and each voxel is assigned a non-zero value if a data point of the lidar data falls within its volume. For example, the value of the voxel may be set to one. Preferably, the relation between individual data points and the 3D voxel is stored, e.g. an array or matrix is stored linking each data point to one of the 3D voxels.

For example, the 3D voxels may have a width, length and height of 5-100 cm, preferably 5-50 cm, more preferably 5-25 cm, and most preferably 5-15 cm. The voxels are preferably cubic, i.e. their width, length and height are the same. However, the voxels may alternatively have a rectangular shape.

In step c) an image segmentation algorithm is performed. Image segmentation algorithms are used to distinguish different objects within an image. Although different image segmentation algorithms are known in the art, the inventors found that none of them is suitable per se to apply to tree data to separate individual trees. In particular, conventional image segmentation often leads to over-segmentation, i.e. too many segments are created such that individual trees are not accurately described. However, the inventors found that conventional algorithms can be used to obtain an initial segmentation, which is subsequently improved by steps d) and e) of the method of the invention.

The image segmentation algorithm may comprise an algorithm that requires a 2D image as an input. In that case, a 2D image may be obtained by projecting the data points on to a horizontal plane. Moreover, the 2D image may be obtained by projecting the lidar data points onto a 2D grid.

In step d) and e) two neighbouring segments are compared to determine whether the segments should be merged into a single segment. In other words, steps d) and e) repair any over-segmentation resulting from the image segmentation algorithm of step c). In particular, in step d) the root voxels and branch voxels of each segment is determined. The root voxel is defined as the voxel having the lowest height of the voxels within the segment. Furthermore, the branch voxels of the segment are obtained. Each voxel connected directly or indirectly to a root voxel is considered a branch voxel. For example, a non-zero voxel neighbouring the root voxel is directly connected to said root voxel. In another example, a non-zero voxel is not directly connected to the root voxel, however said voxel is neighbouring another branch voxel, and is therefore considered indirectly connected to the root voxel.

In case more than one voxel has the lowest height, an additional voxel may created below the voxels having the lowest height, the additional voxel being directly connected to said voxels. The additional voxel is then designated as the root voxel of the segment.

Once the root voxel and branch voxels have been determined, the method checks in step e) whether the neighbouring segments need to be merged. The segments are merges only if all three conditions I-III apply. The first condition checks whether the distance between the root voxels of the neighbouring segments is smaller than a first threshold. For example, the threshold may correspond to a distance of 100 cm, 75 cm or 50 cm. The second condition checks whether the distance between the root voxels of the first segment and the closest branch voxel of the second segment is smaller than a second threshold. The second threshold may be equal or different from the first threshold. For example, the second threshold may correspond to a distance of 100 cm, 75 cm or 50 cm. Any suitable method for finding the closest branch voxel may be employed. For example, the method may calculate the distance from the root voxel of the first segment to each of the branch voxel of the second segment and determine the minimum distance. The third condition checks whether the distances between each of the branch voxels of the first segment and the corresponding closest branch voxel of the second segment are smaller than a third threshold. In other words, for each branch voxel of the first segment, the method calculates the distance to the branch voxel of the second segment that is closest to said branch voxel of the first segment. As described above, any suitable method for finding the closest branch voxel of the second segment may be employed. For example, the distance from the branch voxel of the first segment to each of the branch voxels of the second segment is calculated and subsequently the minimum distance is determined.

In rare cases, the image segmentation algorithm of step c. may result in a single segment. In such a case, the steps d. and e. are skipped, as no merging of segments is required. For example, this may occur when the lidar data corresponds to a single isolated tree in an urban environment. In general however, the image segmentation algorithm of step c. results in more than one segment, such that steps d. and e. are subsequently executed to merge two or more segments on the basis of conditions I-III in step e.

In an embodiment, step c. of the method comprises applying watershed segmentation to obtain the at least one segment.

Watershed segmentation is a known image segmentation algorithm. The inventors found that the watershed segmentation algorithm is an efficient way of finding an initial segmentation of the lidar data points. Although applying the watershed algorithm to the lidar points leads to over-segmentation, it provides a promising intermediate segmentation for employing steps d and e, which resolves said over-segmentation by merging segments.

Watershed segmentation in general requires a 2D image as input. Preferably, the method of the invention comprises projecting the data points onto a 2D grid corresponding to the horizontal plane and performing the watershed segmentation on said 2D projection. Preferably, each lidar data point is projected into a grid cell of the 2D grid, wherein a grid cell obtains a non-zero value if it contains one or more data points.

In an embodiment, the method comprises projecting the 3D voxels on a 2D grid corresponding to the horizontal plane, wherein each grid cell is assigned a value on the basis of the height of coordinates of the 3D voxels projected onto said grid cell.

Alternatively, the lidar data points may be projected directly into the 2D grid, i.e. the lidar data points instead of the 3D voxels are projected on the horizontal plane.

In a further embodiment, each grid cell of the 2D grid is assigned a value corresponding to an average, a mode, a median or a maximum of the height coordinates of the 3D voxels or lidar data points projected onto said grid cell.

More than one 3D voxel may be projected onto a single grid cell. The value of a 2D grid cell may be based on the height coordinates of the corresponding 3D voxels.

In a preferred embodiment, steps d. and e. are iterated over all segments.

It is noted that when a segment is merged with another segment, the newly form segmented is used in the next iteration of the algorithm. For example, in step c) segments A, B, C are obtained. In this example, B is neighbouring A and C is a neighbouring B. In a first iteration of steps d. and e. the neighbouring segments A and B are compared. If step e. determines that A and B should b e merged, the next iteration is performed using segments A' and C, wherein A' is the merger of A and B. Subsequently, segment A' is compared with segment C, which is now neighbouring A' as it was previously neighbouring B.

In an embodiment, step a) comprises obtaining lidar data, separating lidar data in ground data and non-ground data and separating non-ground data in said lidar data of a group of one or more trees and non-tree data.

In other words, the lidar data is separated into tree data and non-tree data.

In an embodiment, the method further comprises modelling the individual trees on the basis of the obtained individual tree segments to produce a set of 3D models of each individual tree.

Steps a-e of the method result in a segmentation of the lidar data into segments corresponding to individual trees. Subsequently, tree models can be generated on the basis of the data of each segment. For example, the height and width of the tree is extracted from each segment for modelling the tree.

In a further embodiment, the method comprises extracting parameters from the segments corresponding to individual trees.

The lidar data has been segmented into segments corresponding to individual trees. The method may extract parameters directly from the lidar data of each segment, or may apply a modelling step wherein a 3D model of the tree is built prior to extracting the parameters.

For example, the volume of the tree may be determined. In another example, the type of tree is determined.

Preferably, the parameters may comprise a height of a tree, a volume of the tree and a canopy area of the tree.

The invention further relates to a computer program product comprising non-transitory computer-executable instructions configured to, when executed, perform the method as described above.

Further advantage, features and details of the invention are elucidated on basis of exemplary embodiments thereof, wherein reference is made to the accompanying drawings.

Figure 8A:
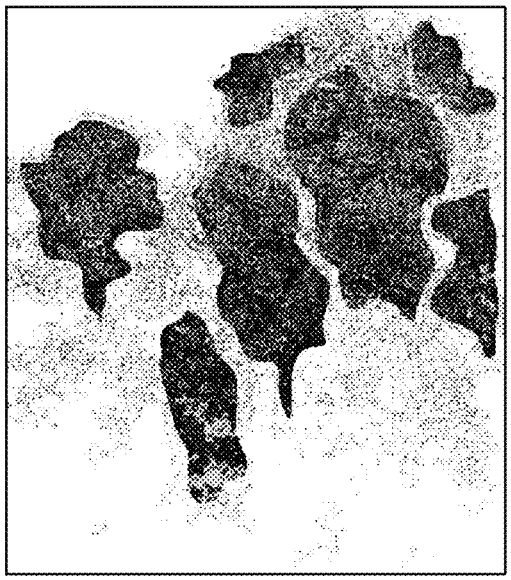
Figure 8B:
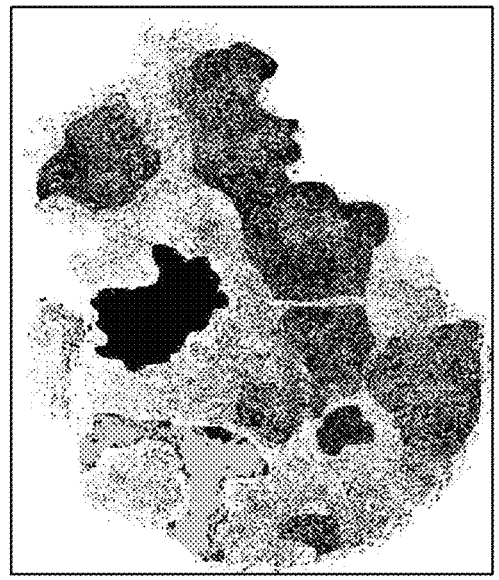
Figure 9A:
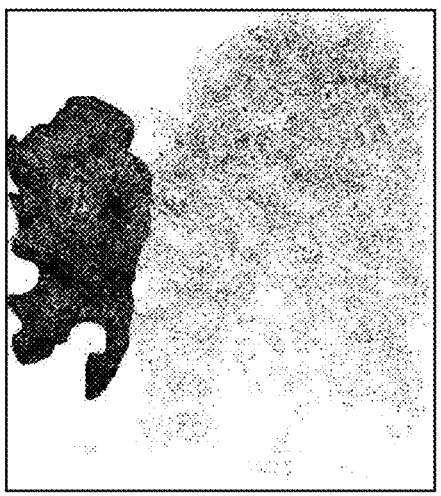
Figure 9B:
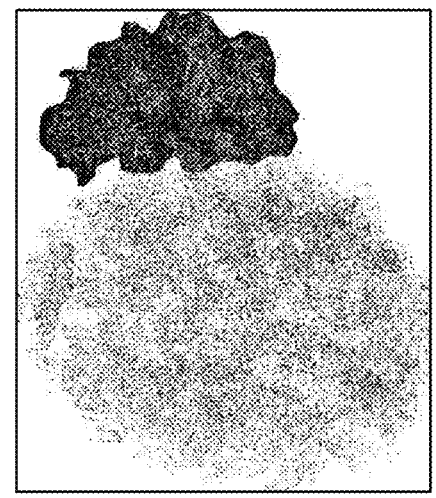

FIGS. 8A-B illustrate a segmentation of tree data after applying watershed segmentation, in front view and plan view respectively; and FIGS. 9A-B illustrate the segmentation of tree data the method according to an embodiment of the invention has been applied to the data shown in FIGS. 8A-B, in front view and plan view respectively.

Figure 1:
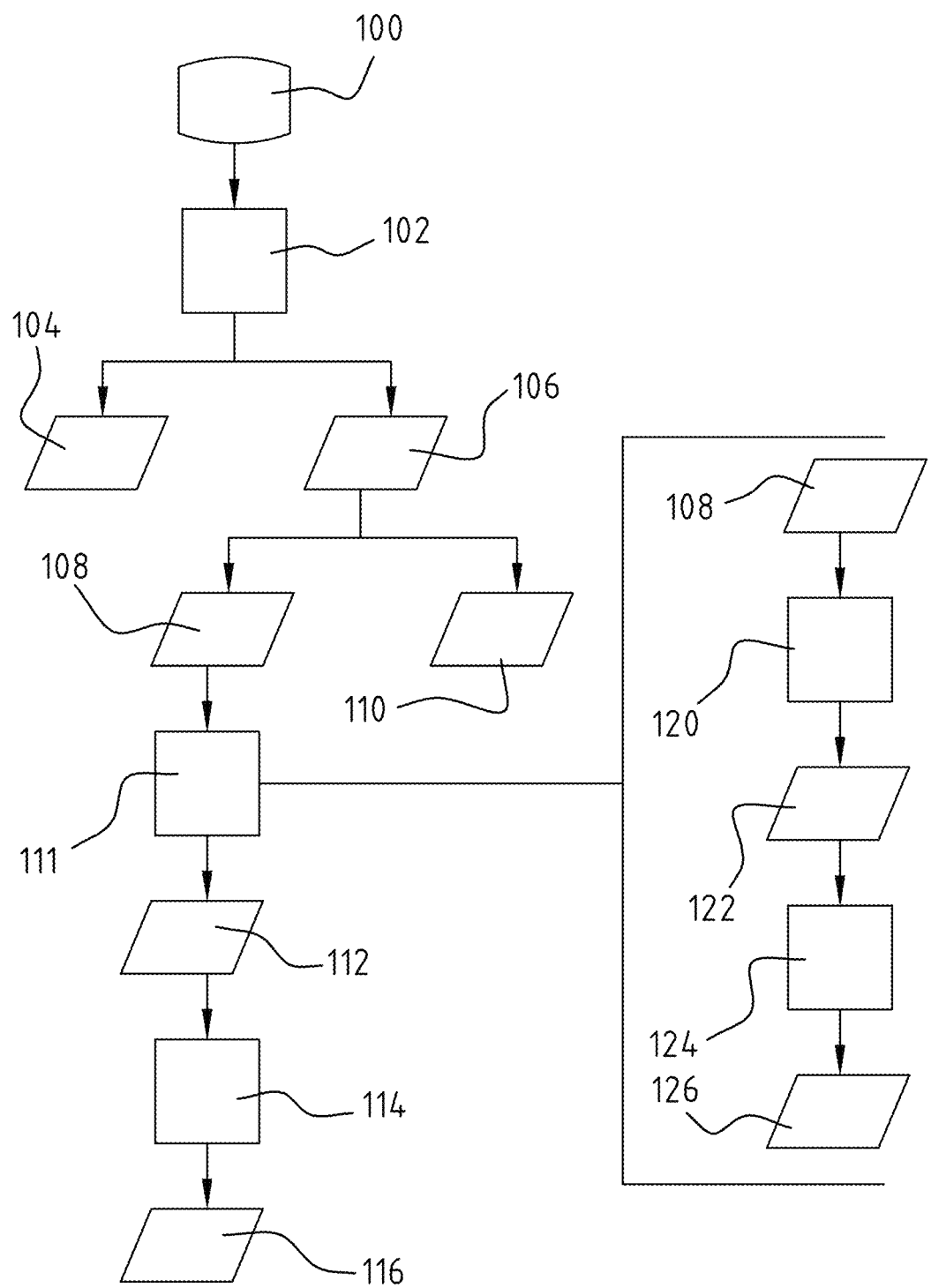
FIG. 1 shows a diagram of an embodiment of a method according to the invention.

In an embodiment, airborne lidar data 100 is obtained (FIG. 1). The lidar data 100 comprises a number of data points, each comprising a 3D coordinate, e.g. longitude, latitude and elevation. A classification algorithm is applied to the lidar data 100 in step 102 to classify the data points into either ground data 104 or non-ground data 106. The ground data 104 may be processed further in any suitable manner.

Subsequently the non-ground data 106 is subdivided into tree data 108 and non-tree data 110 using a suitable classification algorithm. The tree data 108 comprises data points relating to one or more trees. The non-tree data 110 may be processed further in any suitable manner.

The tree data 108 is segmented in step 111 into segments 112 comprising data relating to individual trees. In other words, tree data 108 is subdivided into groups 112 of data points, each group 112 corresponding to a single tree. The process of identifying individual trees in the tree data 108 is the subject of the present invention and will be described below in more detail.

Once the individual tree data 112 has been obtained, optionally a model is made of one or more of the individual trees in step 114, on the basis of the corresponding individual tree data 112. The modelling may be performed using any suitable algorithm. The modelling 114 results in a 3D tree model 116. Optionally, parameters relating to the individual trees, such as height, volume or type of the tree, may be derived from the 3D tree model 116 or alternatively directly from the individual tree data 112.

The process 111 of identifying individual trees in tree data 108 starts by applying a conventional image segmentation algorithm. In the illustrated embodiment a watershed segmentation algorithm is applied in step 120. The tree data 108 is first projected on a horizontal plane, i.e. the 3D data points of the tree data 108 are projected on the 2D horizontal plane to obtain a 2D image which serves as input for the watershed segmentation algorithm. Preferably, the tree data 108 is projected on a regular 2D grid, i.e. the 3D tree data 108 is projected onto the XY plane to obtain a 2D image comprising pixels. For example, the value of each pixel corresponds to the number of data points projected in said pixel or the average, mean, mode, maximum or minimum of the Z-value of the data points projected in said pixel. The link between each 3D data point and its corresponding 2D pixel is stored. The watershed algorithm is subsequently applied to the 2D image to obtain a number of segments. For each pixel of the 2D image, the corresponding 3D data points are assigned to the corresponding segment, i.e. the segment to which said pixel belongs.

The result of step 120 is that each data point in the tree data 108 has been assigned to one of a number of segments. For example, the segmented tree data 122 resulting from step 120 may comprise the tree data points 108, wherein a segment tag has been added to each data point 108 to indicate to which segment said data point 108 belongs. In other words, the result of step 120 is a number of segments, each comprising a subset of the 3D data points of the tree data 108. However, step 120 results in an over-segmentation: the segments do not yet correspond to individual trees. To eliminate or at least reduce the over-segmentation, the over-segmented tree data points 122 are subjected to a merging step 124, which the inventors have labeled "3D voxel merge". The merging step 124 reduced the over-segmentation and produces a set 126 of segments comprising 3D data points, wherein each segment corresponds to a single tree.

Figure 2:
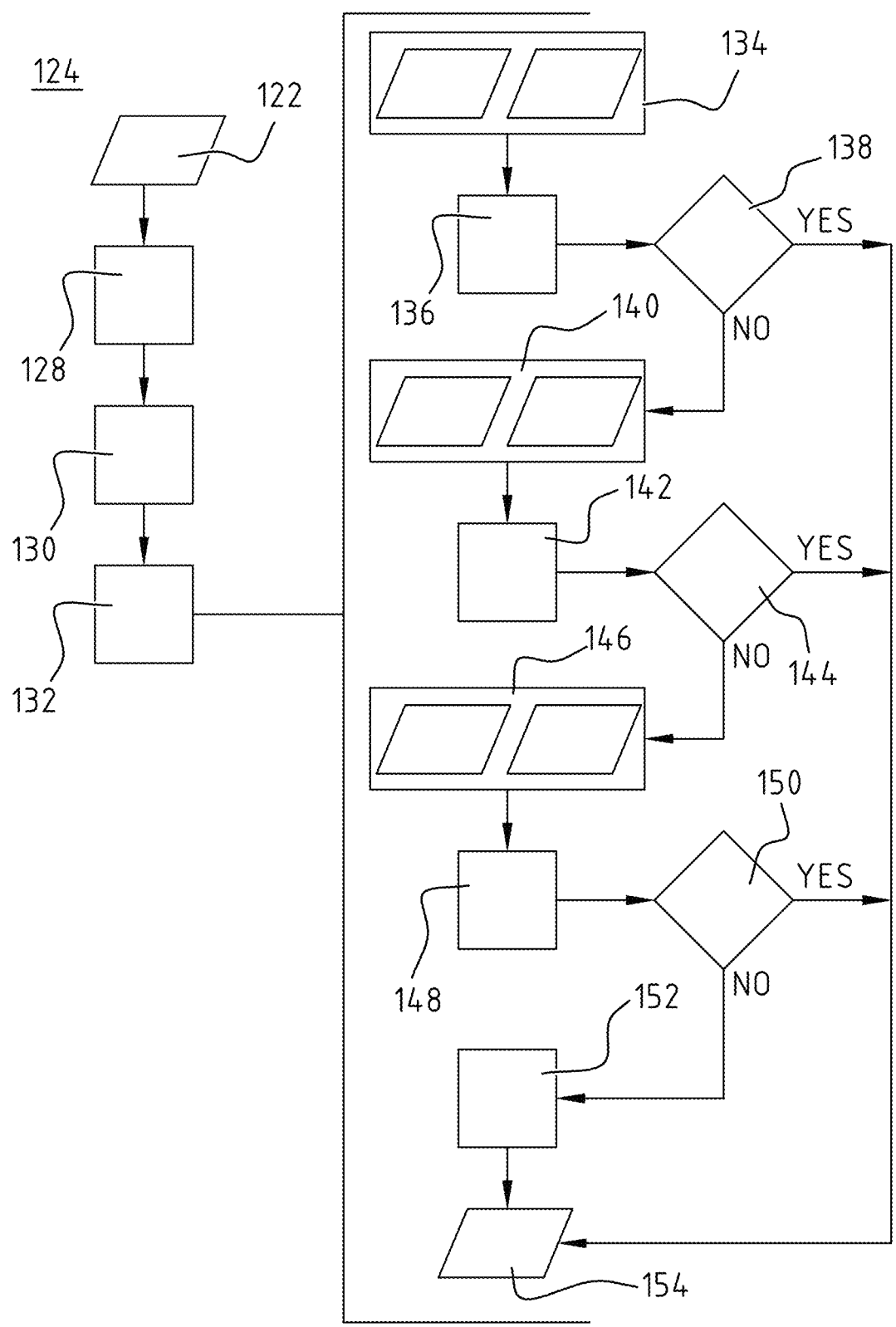
FIG. 2 shows a diagram of merging segments according to the embodiment of the method of FIG. 1.

Step 124 is further illustrated in FIG. 2. The over-segmented treed data points 122 obtained by watershed segmentation 120 are put into a regular 3D grid in step 128. In other words, 3D voxels are defined on the basis of said data points 122. For two neighbouring segments, the root voxels and branch voxels are determined in step 130. Step 130 will be further elucidated on the basis of FIG. 3.

Figure 3:
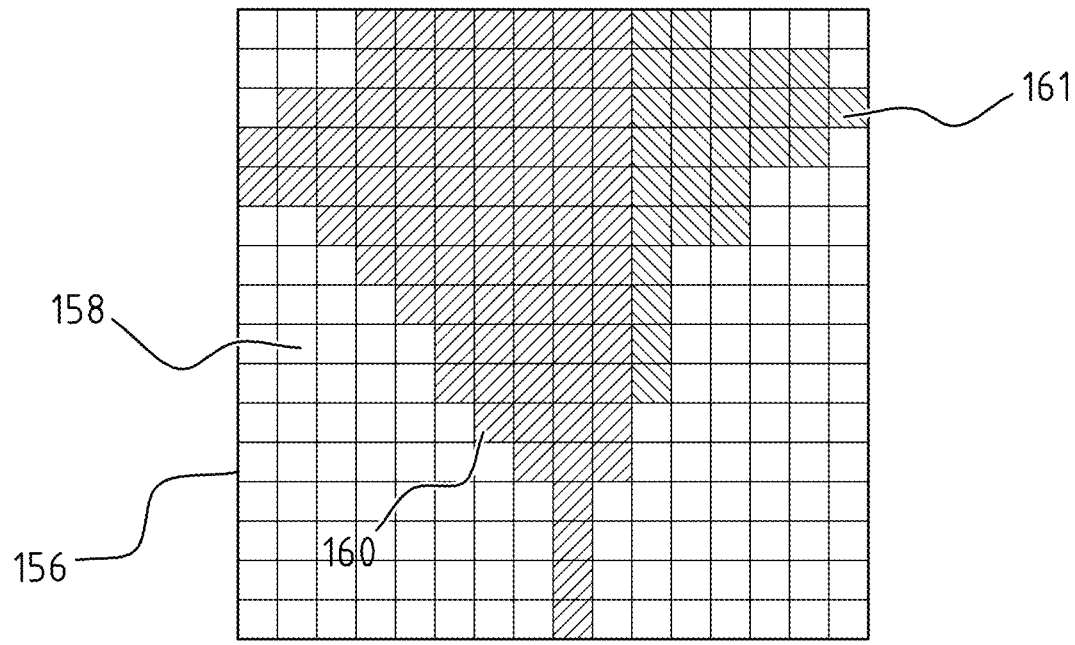
FIG. 3 illustrates in 2D the step of providing the data into a grid.

FIG. 3 shows an example of two neighbouring segments, wherein the voxels of each segment have been illustrated. For illustrative purposes the segments are shown in a side view, i.e. in a 2D view. In practice however, step 130 is applied to a 3D matrix of voxels.

The grid 156 comprises voxels 158, 160. Voxels which contain no data points of the segmented tree data 122 have a zero value, e.g. voxel 158. Voxels containing at least one data point of the segmented tree data 122 have non-zero value, e.g. voxel 160. For illustrative purposes, the voxels 160 corresponding to segment 1 are illustrated with stripes in the direction from lower left to upper right, while the voxels 161 corresponding to segment 2 are illustrated with stripes in the direction from lower right to upper left.

Figure 4A:
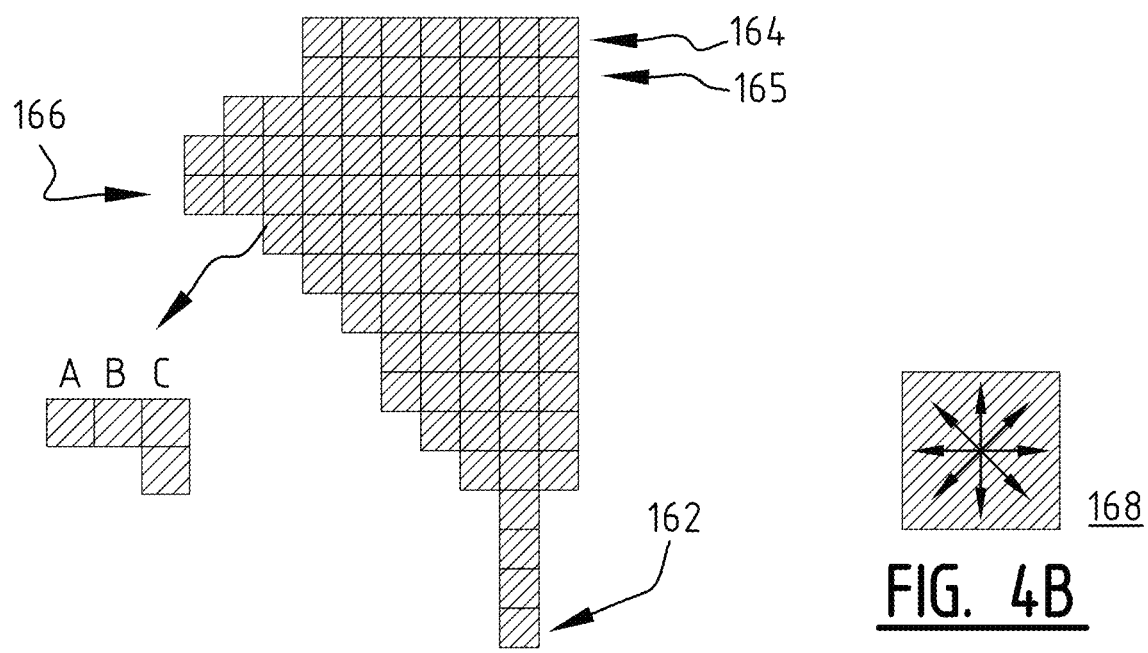
FIG. 4 illustrates in 2D the steps of finding the root voxel and branch voxels of a segment.
Figure 4B:
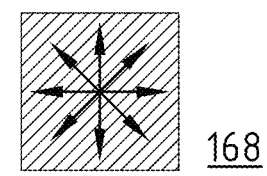

Finding the root voxel and branch voxels of segment 1 is further illustrated in FIGS. 4A-B. In the example illustrated in FIG. 4A-B, the leaf voxels are determined in a first step. The leaf voxels are the non-zero voxels having the greatest height of all non-zero voxels. For example, in FIG. 4A, voxel 164 represents a leaf voxel. Subsequently, the non-zero voxels directly below the leaf voxel are determined; these voxels are referred to as "direct father voxels". For example, leaf voxel 164 has voxel 165 directly below it. It is noted that in 3D a voxel may have 9 voxels directly below it (see FIG. 4B). Any of the non-zero voxels of the 9 voxels below a leaf voxel may be chosen as a direct father voxel. If no direct father is obtained for a first voxel, i.e. the first voxel has no non-zero voxels below it, the direct father of a neighbouring voxel of the first voxel is searched. When a direct father of a neighbouring voxel is found, said direct father is set as the father voxel of the first voxel. For example, in FIG. 4A, voxel A does not have a non-zero voxel below it. Therefore, it is checked whether A's neighbour B has a non-zero voxel below it. In the example shown, voxel B has no non-zero voxel below it either. Therefore, it is checked whether C has a non-zero voxel below it. In the example shown, voxel C has indeed a voxel D below it, and therefore said voxel D is set as the father of C, B and A. This process is repeated until a voxel 162 is found which has no father voxel, direct or indirect. This voxel 162 is determined the root voxel of the segment. From the root voxel 162, the children of each father are derived as the branches.

Figure 5:
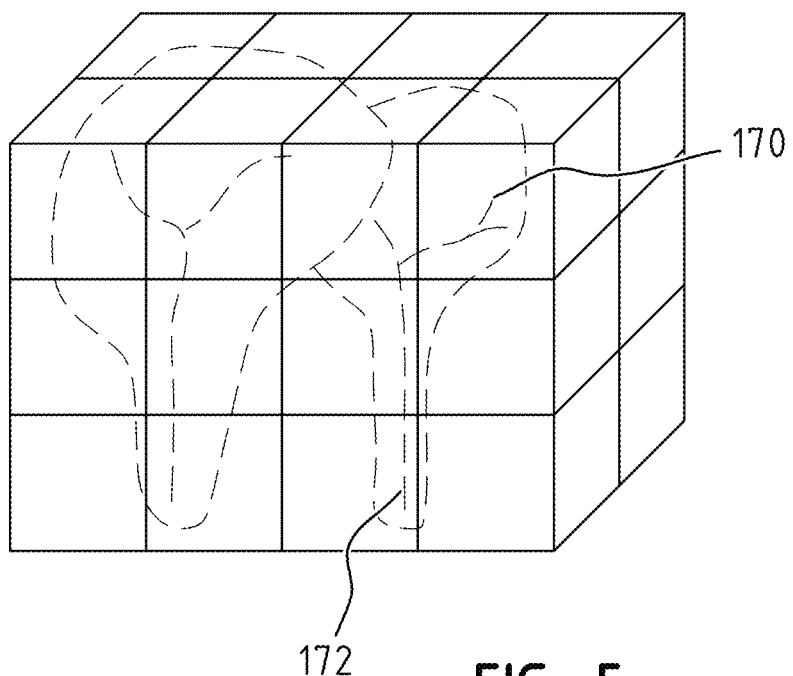
FIG. 5 illustrates in 3D the step of providing the data into a grid.

Alternatively, step 130 is implemented by defining the non-zero voxel having the minimum height as the root voxel of the segment, while all other non-zero voxels are defined as branch voxels of the segment. This has been illustrated in FIG. 5, wherein voxel 170 is a branch voxel, while voxel 172 is a root voxel.

Returning to FIG. 2: when step 130 has been completed, and the root voxels and branch voxels of the over-segmented tree data points 122 have been determined, the illustrated method continues to step 132. In step 132 it is determined whether the neighbouring segments should be merged.

In a first sub-step 134 of step 132, the distance 136 between the root voxel of the first segment and the root voxel of the second segment is determined. In step 138 it is checked whether the distance 136 is exceeds a first predetermined threshold. If the threshold is not exceeded, the method continues to step 140, wherein the root voxel of the first segment is compared to the branch voxels of the second segment. The distances 142 between the root voxel of the first segment to each branch voxel of the second segment are calculated. In step 144, it is checked whether all distances 148 are smaller than a predetermined second threshold. If so, the method continues to step 146. In step 146 the distances 148 between each branch voxel of the first segment and each branch voxel of the second segment is calculated. The distance is compared to a third predetermined threshold in step 150. If the distances 148 are all smaller than the third threshold, the first segment is merged with the second segment. For example, the segment tag of data points having segment tag "2" is set to "1" to merge the segments. In case one or more of the conditions 138, 144, 150 does not apply, the first segment and the second segment are not merged.

The method steps 130 and 132 are iterated over all segments, to finally obtain segments 126 corresponding to individual trees.

Figure 6:
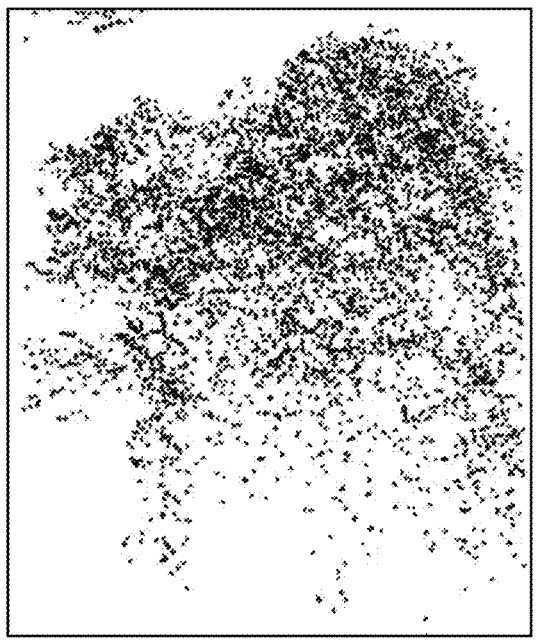
FIG. 6 illustrates tree data as input for an embodiment of the method of the invention.
Figure 7:
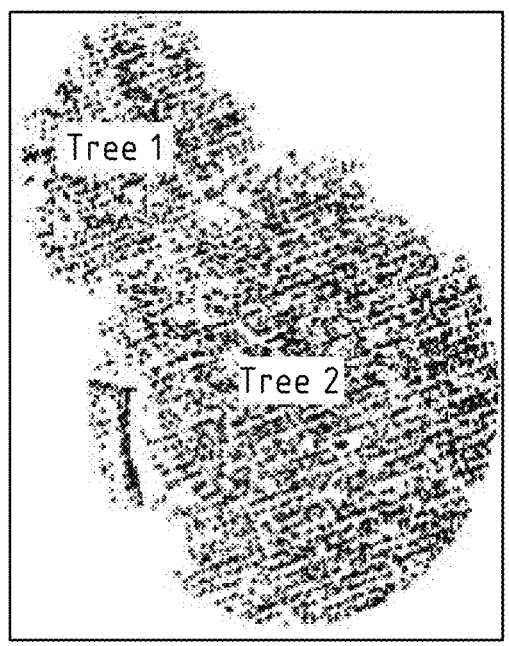
FIG. 7 illustrates the result of applying an embodiment of the method of the invention to the data shown in FIG. 6.

A test has been performed of the segmentation step 111 according to an embodiment of the invention. The data used as input for this test is illustrated in FIG. 6 in a side view and in FIG. 7 in top view. Each data point in the test data set related to one of two trees, indicated as tree 1 and tree2 in FIG. 7. The information to which of the two trees each data point belongs was not provided to the algorithm, but was only used after applying the algorithm to compare the result of the algorithm with the original segmentation.

FIGS. 8A and 8B show the segmentation after watershed segmentation, i.e. step 120, has been applied, in side view and plan view respectively. The segmentation is shown as areas having the same gray scale colour. As can be clearly seen from FIGS. 8A and 8B, the result of the watershed segmentation of step 120 is heavily over-segmented. However, after the merging step 124, the number of segments is reduced to two, as illustrated in FIG. 9A-B in side view and plan view respectively. These segments indeed correspond to the individual trees tree 1 and tree2.

The present invention is by no means limited to the above described preferred embodiments thereof. The rights sought are defined by the following claims, within the scope of which many modifications can be envisaged.

Clauses

1. Method for identifying individual trees in airborne lidar data, comprising the steps of:
   a. obtaining lidar data of a group of one or more trees to be separated into individual trees, the lidar data comprising a plurality of lidar data points;
   b. define voxels in a regular 3D grid on the basis of the lidar data points;
   c. applying an image segmentation algorithm to obtain at least one segment comprising a subset of the 3D voxels;
   wherein the following steps are performed if at least two segments are obtained in step c.:
   d. for each of a first segment and a second neighbouring segment of said at least two segments:
      I. find the root voxel of said segment, the root voxel being a voxel having the lowest height of the voxels of said segment;
      II. find the branch voxels of said segment, wherein a branch voxel is a voxel connected directly or indirectly to the root voxel;
   e. merging the first segment and the neighbouring second segment if:
      I. the distance between the root voxel of the first segment and the root voxel of the second segment is less than a first threshold; and
      II. the distance between the root voxel of the first segment and the closest branch voxel of the second segment is less than a second threshold; and
      III. the distance between each of the branch voxels of the first segment and the corresponding closest branch voxels of the second segment is less than a third threshold.

2. Method according to clause 1, wherein step c. comprises applying watershed segmentation to obtain the at least one segment.

3. Method according to clause 2, comprising projecting the 3D voxels on a 2D grid corresponding to the horizontal plane, wherein each grid cell is assigned a value on the basis of the height coordinates of the 3D voxels projected onto said grid cell.

4. Method according to clause 3, wherein each grid cell is assigned a value corresponding to an average, a mode, a median or a maximum of the height coordinates of the 3D voxels projected onto said grid cell.

5. Method according to any preceding clause, wherein steps d. and e. are iterated over all segments.

6. Method according to any of the preceding clauses, wherein step a. comprises obtaining lidar data, separating lidar data in ground data and non-ground data and separating non-ground data in said lidar data of a group of one or more trees and non-tree data.

7. Method according to any of the preceding clauses, further comprising modelling the individual trees on the basis of the obtained individual tree segments to produce a set of 3D models for each individual tree.

8. Method according to any of the preceding clauses, further comprising extracting parameters from the segments corresponding to individual trees.

9. Method according to clause 8, the parameters comprising at least one of: height of the tree, volume of the tree and canopy area of the tree.

10. A computer program product comprising non-transitory computer-executable instructions configured to, when executed, perform the steps of the method of any of the preceding clauses.

The invention claimed is:

1. A method for identifying individual trees in airborne lidar data, comprising the steps of:
   a. obtaining lidar data of a group of one or more trees to be separated into individual trees, the lidar data comprising a plurality of lidar data points;
   b. define voxels in a regular 3D grid on the basis of the lidar data points;
   c. applying an image segmentation algorithm to obtain at least one segment comprising a subset of the 3D voxels;
   wherein the following steps are performed if at least two segments are obtained in step c: d. for each of a first segment and a second neighbouring segment of said at least two segments:
      I. find the root voxel of said segment, the root voxel being a voxel having the lowest height of the voxels of said segment;

II. find the branch voxels of said segment, wherein a branch voxel is a voxel connected directly or indirectly to the root voxel;

e. merging the first segment and the neighbouring second segment if:
I. the distance between the root voxel of the first segment and the root voxel of the second segment is less than a first threshold; and
II. the distance between the root voxel of the first segment and the closest branch voxel of the second segment is less than a second threshold; and
III. the distance between each of the branch voxels of the first segment and the corresponding closest branch voxels of the second segment is less than a third threshold.

2. The method according to claim 1, wherein step c. comprises applying watershed segmentation to obtain the at least one segment.

3. The method according to claim 2, comprising projecting the 3D voxels on a 2D grid corresponding to the horizontal plane, wherein each grid cell is assigned a value on the basis of the height coordinates of the 3D voxels projected onto said grid cell.

4. The method according to claim 3, wherein each grid cell is assigned a value corresponding to an average, a mode, a median or a maximum of the height coordinates of the 3D voxels projected onto said grid cell.

5. The method according to claim 1, wherein steps d. and e. are iterated over all segments.

6. The method according to claim 1, wherein step a. comprises obtaining lidar data, separating lidar data in ground data and non-ground data and separating non-ground data in said lidar data of a group of one or more trees and non-tree data.

7. The method according to claim 1, further comprising modelling the individual trees on the basis of the obtained individual tree segments to produce a set of 3D models for each individual tree.

8. The method according to claim 1, further comprising extracting parameters from the segments corresponding to individual trees.

9. The method according to claim 8, the parameters comprising at least one of: height of the tree, volume of the tree and canopy area of the tree.

10. A computer program product comprising non-transitory computer-executable instructions configured to, when executed, perform the steps of the method of claim 1.

* * * * *